United States Patent [19]

Schappler

[11] Patent Number: 5,115,264

[45] Date of Patent: May 19, 1992

[54] PHOTOGRAPHIC CAMERA WITH INTEGRATABLE WRIST STRAP

[75] Inventor: Joseph J. Schappler, Bedford, N.H.

[73] Assignee: Eastman Kodak Company, Rochester, N.Y.

[21] Appl. No.: 714,296

[22] Filed: Jun. 12, 1991

[51] Int. Cl.⁵ .............................................. G03B 29/00
[52] U.S. Cl. ...................................... 354/82; 354/288
[58] Field of Search .................... 354/81, 82, 288, 293

[56] References Cited

U.S. PATENT DOCUMENTS 4,348,095 9/1982 Suzuki et al. ..................... 354/288

Primary Examiner—L. T. Hix
Assistant Examiner—David M. Gray
Attorney, Agent, or Firm—Roger A. Fields

[57] ABSTRACT

A camera body has an elongate recess which is dimensioned to receive a looped wrist strap to substantially integrate the wrist strap with the camera body. When the wrist strap is in the elongate recess, it slightly protrudes from the recess to permit it to be used further as a fixed hand grip for the camera body.

7 Claims, 1 Drawing Sheet

PHOTOGRAPHIC CAMERA WITH INTEGRATABLE WRIST STRAP

BACKGROUND OF THE INVENTION

1. Field of the Invention

The invention relates generally to the field of photographic cameras, and particularly to an improved camera with an integratable wrist strap.

2. Description of the Prior Art

It is well known to provide a flexible looped wrist strap for a photographic camera. See U.S. Pat. No. 2,130,262, issued Sep. 13, 1938. The wrist strap is anchored to the camera body to permit it to be extended in the form of a closed loop from the camera body to receive one's wrist or hand in the loop.

A problem that exists generally with known wrist straps is the inability to contain them in a folded or like manner in order to store them when not in use.

SUMMARY OF THE INVENTION

According to the invention, a photographic camera comprising a camera body, and a flexible looped wrist strap secured to the camera body to permit the wrist strap to be extended along its length as a loop from the camera body to receive one's wrist in the loop, is characterized in that:

the camera body has an elongate recess which is dimensioned to receive the looped wrist strap along its length to substantially integrate the wrist strap with the camera body, but to cause the wrist strap to slightly protrude along its length from the elongate recess to permit the wrist strap to be used further as a fixed hand grip for the camera body.

Preferably, the looped wrist strap is elastic and has an overall length that is less than the overall length of the elongate recess to require the wrist strap to be stretched to fit into the elongate recess.

In a variation of the invention, a photographic camera comprising a camera body, and a flexible looped wrist strap secured to the camera body to permit the wrist strap to be extended as a closed loop from the camera body to receive one's wrist in the closed loop, is characterized in that:

the camera body has a substantially continuous recess which is dimensioned to receive the looped wrist strap generally in the form of the closed loop to substantially integrate the wrist strap with the camera body.

DETAILED DESCRIPTION OF THE PREFERRED EMBODIMENT

The invention is disclosed as being embodied preferably in a photographic camera. Because the features of this camera are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
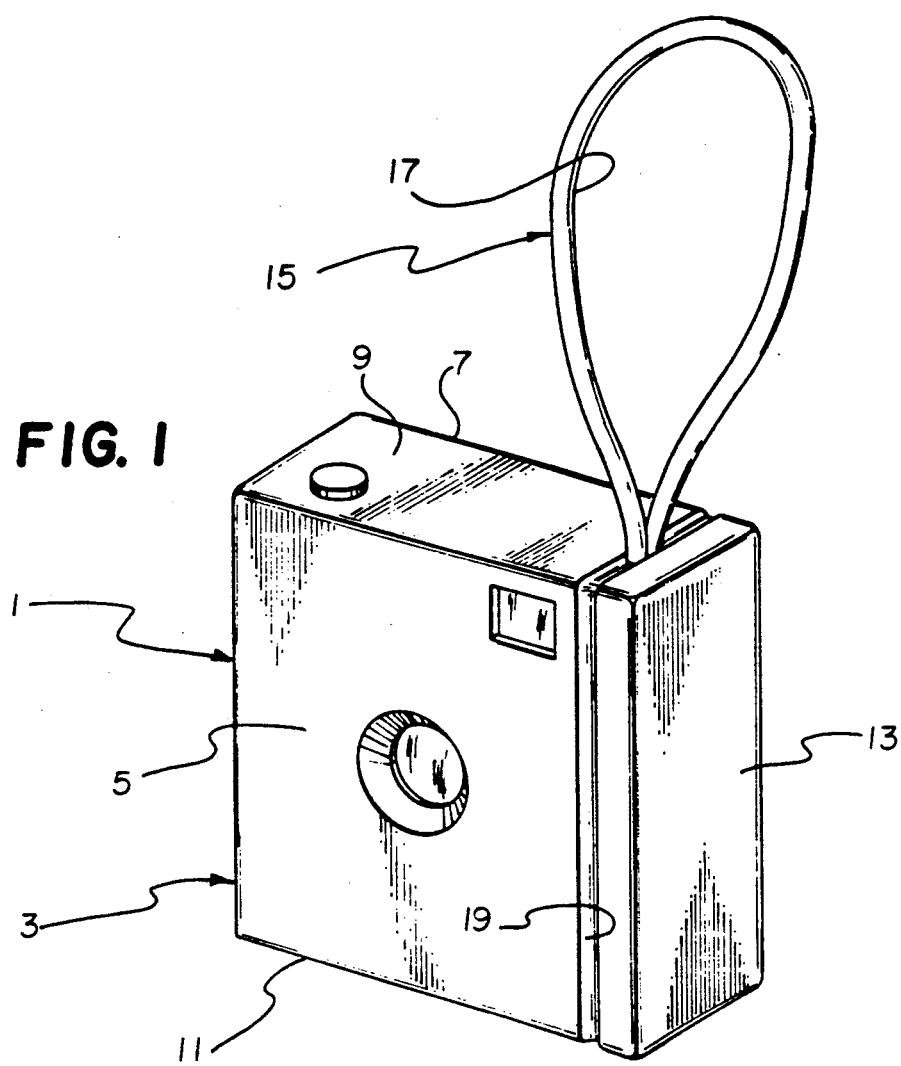
FIG. 1 is a front perspective view of a photographic camera according to a preferred embodiment of the invention, showing a wrist strap extended from the camera body in the form of a closed loop.

Referring now to the drawings, FIG. 1 shows a photographic camera 1 including a camera body 3 which has a front face 5, a rear face 7, a top face 9, a bottom face 11, and a right end face 13 adjoining the front, rear, top and bottom faces. A flexible looped wrist strap 15 is secured by known means, not shown, to the camera body 3 to permit the wrist strap to be extended as a closed loop 17 from the camera body to receive one's hand or wrist in the closed loop.

Figure 2:
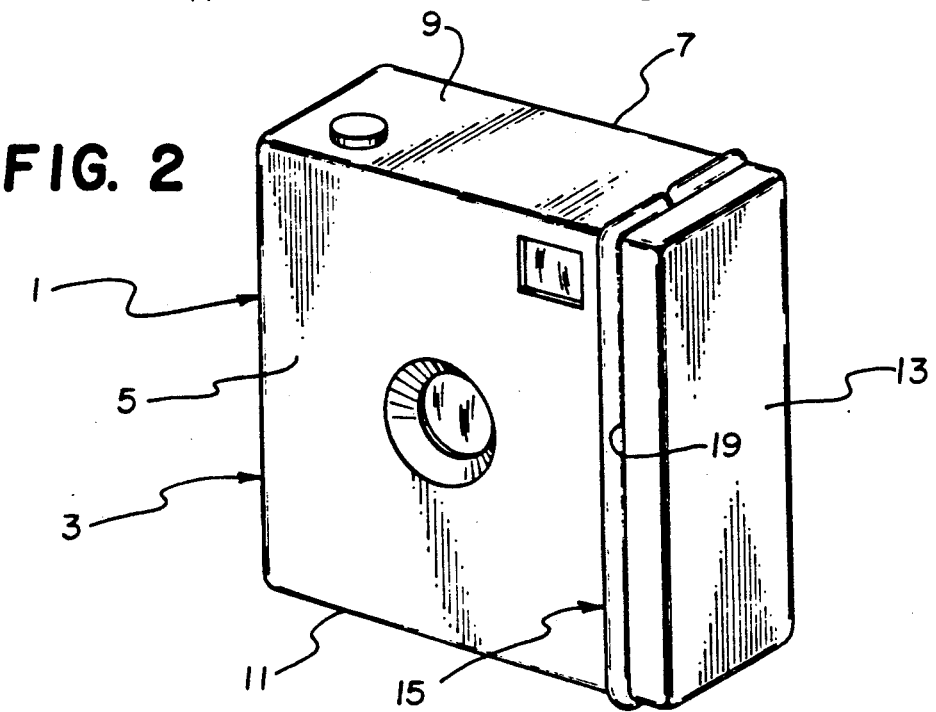
FIG. 2 is a front perspective view similar to FIG. 1, showing the wrist strap stored in a recess in the camera body.

The camera body 3 has an elongate recess 19 which circumscribes the front, rear, top and bottom faces 5, 7, 9 and 11 at a location proximate the right end face 13. The elongate recess 19 is dimensioned to receive the wrist strap 15 in the form of the closed loop 17 as shown in FIG. 2, to substantially integrate the wrist strap 15 with the camera body 3. When the wrist strap 15 is in the elongate recess 19, it slightly protrudes from the recess to be used further as a fixed hand grip for the camera body 3. The wrist strap 15 is elastic and has an overall length that is less than the overall length of the elongate recess 19 to require the wrist strap to be stretched to fit into the recess.

The invention has been described with reference to a preferred embodiment. However, it will be appreciated that modifications and variations can be effected within the ordinary skill in the art without departing from the scope of the invention.

I claim:

1. A photographic camera comprising a camera body, and a flexible looped wrist strap secured to said camera body to permit said wrist strap to be extended along its length as a loop from the camera body to receive one's wrist in said loop, is characterized in that:

said camera body has an elongate recess which is dimensioned to receive said looped wrist strap completely along the length of the wrist strap to fully integrate the wrist strap with said camera body, but to cause the wrist strap to slightly protrude along its length from said elongate recess to permit the wrist strap to be used further as a fixed hand grip for the camera body.

2. A photographic camera comprising a camera body, and a flexible looped wrist strap secured to said camera body to permit said wrist strap to be extended along its length as a loop from the camera body to receive one's wrist in said loop, is characterized in that:

said camera body has an elongate recess which is dimensioned to receive said looped wrist strip along its length to substantially integrate the wrist strap with said camera body; and said looped wrist strap is elastic and has an overall length that is less than the overall length of said elongate recess to require the wrist strap to be stretched to fit into the elongate recess.

3. A photographic camera comprising a camera body, and a flexible looped wrist strap secured to said camera body to permit said wrist strap to be extended as a closed loop from the camera body to receive one's wrist in said closed loop, is characterized in that:

said camera body has a continuous recess which is dimensioned to receive said looped wrist strap in the form of said closed loop and for the length of the wrist strap to integrate the wrist strap with said camera body.

4. A photographic camera as recited in claim 3, wherein camera body has front, rear, top and bottom faces and an end face adjoining said front, rear, top and bottom faces, and said continuous recess circumscribes said front, rear, top and bottom faces at a location proximate said end face.

5. A photographic camera comprising a camera body, and a flexible looped wrist strap secured to said camera body to permit said wrist strap to be extended along its length as a loop from the camera body to receive one's wrist in said loop, is characterized in that:

said camera body has an elongate recess which is dimensioned to receive said looped wrist strap along its length to substantially integrate the wrist strap with said camera body, but to cause the wrist strap to slightly protrude along its length from said elongate recess to permit the wrist strap to be used further as a fixed hand grip for the camera body; and said looped wrist strap is elastic and has an overall length that is less than the overall length of said elongate recess to require the wrist strap to be stretched to fit into the elongate recess.

6. A photographic camera comprising a camera body, and a flexible looped wrist strap secured to said camera body to permit said wrist strap to be extended along its length as a loop from the camera body to receive one's wrist in said loop, is characterized in that:

said camera body has an elongate recess which is dimensioned to receive said looped wrist strap along its length to substantially integrate the wrist strap with said camera body, but to cause the wrist strap to slightly protrude along its length from said elongate recess to permit the wrist strap to be used further as a fixed hand grip for the camera body, and has front, rear, top and bottom faces circumscribed by said elongate recess.

7. A photographic camera as recited in claim 6, wherein said camera body has an end face adjoining said front, rear, top and bottom faces, and said elongate recess circumscribes said front, rear, top and bottom faces at a location proximate said end face.

* * * * *